United States Patent
Fujita et al.

(10) Patent No.: US 6,326,432 B1
(45) Date of Patent: Dec. 4, 2001

(54) POLYPROPYLENE COMPOSITION

(75) Inventors: Hiroyuki Fujita, Ichihara; Jun Saito, Kimitsu; Yoshitoyo Yasuda, Ichihara; Tsutomu Ushioda, Ichihara; Mototake Tsutsui, Ichihara; Yoshiyuki Ohgi, Yokoshiba-machi; Minoru Adachi, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/508,799

(22) PCT Filed: Sep. 17, 1998

(86) PCT No.: PCT/JP98/04169
§ 371 Date: Mar. 17, 2000
§ 102(e) Date: Mar. 17, 2000

(87) PCT Pub. No.: WO99/14270
PCT Pub. Date: Mar. 25, 1999

(30) Foreign Application Priority Data

Sep. 18, 1997 (JP) ..................................... 9-253688

(51) Int. Cl.$^7$ .............................. C08F 8/00; C08L 23/00; C08L 23/04
(52) U.S. Cl. ........................................... 525/191; 525/240
(58) Field of Search ...................... 525/191, 240

(56) References Cited

U.S. PATENT DOCUMENTS 5,516,848 * 5/1996 Canich et al. ..................... 525/240
5,539,056 * 7/1996 Yang et al. ........................ 525/240

\* cited by examiner

*Primary Examiner*—Nathan M. Nutter
(74) *Attorney, Agent, or Firm*—Leydig, Voit & Mayer, Ltd.

(57) ABSTRACT

Disclosed is a polypropylene composition excellent in balance of low temperature impact-strength, rigidity, heat resistance and transparency, which is featured by comprising 20–95% by weight of a polypropylene defined in the following [I] and 5–80% by weight of a propylene-α-olefin copolymer defined in the following [II]:

[I] a polypropylene featured by having:
(1) a ratio of isotactic pentad (mmmm) of 0.900–0.949,
(2) the 2,1- and 1,3-propylene units in the polymer chain in the amount of 0–1 mole %,
(3) a weight average molecular weight (Mw) of 40,000–1,000,000,
(4) a ratio of a weight average molecular weight (Mw) to a number average molecular weight (Mn), i.e. (Mw)/(Mn) of 1.5–3.8, and
(5) in case of elevating the temperature of o-dichlorobenzene continuously or stepwise up to given temperatures to measure the amount of eluted polypropylene at each temperature, the position of a main elution peak is 95–110° C. and the amount of components existing in the range of ±10° C. of the main elution peak is at least 90% of the total amounts of components eluted at a temperature higher than 0° C. and

[II] a propylene-α-olefin copolymer containing 10–90% by weight of a constituent derived from propylene and 10–90% by weight of a constituent derived from α-olefin other than propylene.

11 Claims, No Drawings

1

POLYPROPYLENE COMPOSITION

This application is a national phase of PCT/JP98/04169, filed Sep. 17, 1998, which claims the benefit of Japanese Patent Application No. 9-253688, filed Sept. 18, 1997.

TECHNICAL FIELD

The present invention relates to a novel polypropylene composition, and more particularly it relates to a polypropylene composition excellent in flexibility, low temperature impact-strength, heat resistance and rigidity.

BACKGROUND ART

Crystalline polypropylene is excellent in mechanical properties and chemical resistance and is economical so that it is employed for a variety of moldings. However, when a homopolymer of propylene is used as the crystalline polypropylene, the homopolymer is high in rigidity but is inferior in flexibility and low temperature impact-strength. For this reason, a method for combining homopolymer of propylene with an ethylene-propylene elastomer or an ethylene-propylene-diene elastomer and a process for producing so-called block copolymers by homopolymerization of propylene followed by copolymerization of propylene with ethylene has been disclosed.

In recent years, a process for producing isotactic polypropylene by polymerizing propylene with the aid of a new catalyst different from the conventional catalyst system has been disclosed, the new catalyst being comprised of a metallocene and an aluminoxane. Homopolymerization of propylene with the aid of a similar catalyst followed by copolymerization of propylene with ethylene to form the so-called block copolymer is also known.

For instance, use of dimethylsilyl-bis(2,4-dimethylcyclopentadienyl)zirconium dichloride as metallocene is taught in Japanese Laid-open Patent Appln. No. Hei. 4-337308. An example of employing dimethylsilyl-bis(methylcyclopentadienyl)hafnium dichloride is taught in Japanese Laid-open Patent Appln. No. Hei. 6-28757. An example of using rac-ethylene-bis-indenyl hafnium dichloride, rac-dimethylsilyl-bis-indenyl hafnium dichloride, and rac-phenylmethylsilyl-bis-indenyl hafnium dichloride is taught in Japanese Laid-open Patent Appln. No. Hei. 5-202152 and Japanese Laid-open Patent Appln. No. Hei. 6-206921. An example of using dimethylsilylene-bis(2-methylindenyl)zirconium dichloride and dimethylsilylene-bis(tetrahydroindenyl)zirconium is taught in Japanese Laid-open Patent Appln. No. Hei. 6-172414.

It is the current status that moldings made of generally known propylene-ethylene block copolymers obtained by using these metallocenes are improved in flexibility and low temperature impact-resistance to a certain degree but are inferior in heat resistance and rigidity and their intended use is limited in this aspect. In addition, transparency of the moldings is extremely deteriorated so that the intended use is also limited.

Accordingly, it is an object of the present invention to provide industrially advantageous polypropylene having an excellent balance of physical properties such as impact-resistance, especially at a low temperature, rigidity, heat resistance and transparency.

As a result of extensive researches carried out to achieve the aforesaid object, the present inventors have now found a polypropylene composition comprised predominantly of polypropylene having a specific structure and a propylene-α-olefin copolymer and moldings manufactured therefrom having an excellent balance of physical properties, i.e., extremely good impact-strength, especially at a low temperature, rigidity, heat resistance, and transparency. The present invention has been accomplished on the basis of the above finding.

According to the present invention, there is provided a polypropylene composition comprised of 20–95% by weight of polypropylene defined in the following

[I] and 5–80% by weight of a propylene-α-olefin copolymer defined in the following [II]:

[I] polypropylene featured by having:
(1) a ratio of isotactic pentad (mmmm) of 0.900–0.949,
(2) the 2,1- and 1,3-propylene units in the polymer chain in the amount of 0–1 mole %,
(3) a weight average molecular weight (Mw) of 40,000–1,000,000,
(4) a ratio of a weight average molecular weight (Mw) to a number average molecular weight (Mn), i.e., (Mw)/(Mn), of 1.5–3.8, and
(5) in case of elevating the temperature of o-dichlorobenzene continuously or stepwise up to given temperatures to measure the amount of eluted polypropylene at each temperature, the position of a main elution peak is 95–110° C. and the amount of components existing in the range of ±10° C. of the main elution peak is at least 90% of the total amounts of components eluted at a temperature higher than 0° C., and

[II] a propylene-α-olefin copolymer containing 10–90% by weight of a constituent derived from propylene and 10–90% by weight of a constituent derived from α-olefin other than propylene.

In accordance with the present invention, there is also provided the aforesaid polypropylene composition wherein the polypropylene [I] defined in (5) is as follows: in case of elevating the temperature of o-dichlorobenzene continuously or stepwise up to given temperatures to measure the amount of eluted polypropylene at each temperature, the position of a main elution peak is 95–110° C. and the amount of components (E±10) existing in the range of ±10° C. of the main elution peak is at least 95% of the total amounts of components eluted at a temperature higher than 0° C.

According to the present invention, there is further provided the aforesaid polypropylene composition wherein a melting point (Tm) of the aforesaid polypropylene [I] is 147–160° C.

According to the present invention, there is still further provided the aforesaid polypropylene composition wherein an α-olefin in the propylene-α-olefin copolymer [II] is ethylene and (a) a weight average molecular weight (Mw) is 30,000–1,000,000, (b) a ratio of a weight average molecular weight (Mw) to a number average molecular weight (Mn), i.e. (Mw)/(Mn) is 1.5–3.8, and (c) in case of elevating the temperature of o-dichlorobenzene continuously or stepwise, an amount eluted below 0° C. [E(R)] is at least 80% by weight of the total eluted amount.

According to the present invention, there is still further provided the aforesaid polypropylene composition wherein in β' dispersion measured by a dynamic viscoelasticity measuring apparatus a temperature showing the maximum value of tan-δ being −65° C. to −40° C., and a half-width of the peak temperature [Tβ'(½)] is below 20° C.

According to the present invention, there is still further provided the aforesaid polypropylene composition wherein the α-olefin in the propylene-α-olefin copolymer [II] is ethylene, (a) a weight average molecular weight (Mw) is 30,000–1,000,000, (b) a ratio of a weight average molecular weight (Mw) to a number average molecular weight (Mn), i.e. (Mw)/(Mn) is 1.5–3.8, (c) in case of elevating the temperature of o-dichlorobenzene continuously or stepwise, an amount eluted above 0° C. [E(E)] is at least 50% by weight of the total eluted amount.

According to the present invention, there is still further provided the aforesaid polypropylene composition wherein E(E) is at least 80% by weight of the total eluted amount.

According to the present invention, there is still further provided the aforesaid polypropylene composition wherein in a β'-dispersion measured in a dynamic viscoelasticity measuring apparatus, a temperature (Tβ') showing the maximum value of tan-δ is within the range of higher than −40° C. and not higher than −1° C.

According to the present invention, there is still further provided the aforesaid polypropylene composition wherein the polypropylene [I] and the propylene-α-olefin copolymer [II] have been produced by the aid of a catalyst system comprised predominantly of the compounds (A), (B), (C), and (D) shown below: the compound (A): a transition metal compound of the following general formula:

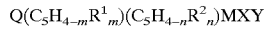

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site of $R^1$ and $R^2$ on the cyclopentadienyl rings should take a configuration where any symmnetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$, M stands for a transition metal Ti, Zr or Hf, and X and Y may be the same or different and each stands for a hydrogen atom, a halogen atom or a hydrocarbon group, the compound (B): an aluminoxane, the compound (C): a finely particulate carrier, and the compound (D): an organoaluminum compound.

According to the present invention, there is still further provided the aforesaid polypropylene composition wherein the compound (A) is dimethylsilylene(2,3,5-trimethylcyclopentadienyl) (2',4',5'-trimethylcyclopentadienyl)zirconium dichloride.

According to the present invention, there is still further provided the aforesaid polypropylene composition which has been obtained by polymerization of the polypropylene [I] followed by copolymerization of the propylene-α-olefin [II].

A BEST EMBODIMENT FOR CARRYING OUT THE INVENTION

An important feature of the present invention resides in a composition comprising a specific polypropylene and a specific propylene-α-olefin copolymer in a specific proportion.

Among the characteristic factors of the polypropylene composition concerned with the present invention, the aforesaid (1) and (2) are calculated from results of measurement conducted at 67.20 MHz and 130° C. using $^{13}C$ nuclear magnetic resonance spectra for a mixed o-dichlorobenzene/benzene bromide (ratio by weight: 8/2) solution having a polymer concentration of 20% by weight. Used as the measuring apparatus is, for example, a JEOL-GX270 NMR measuring apparatus (manufactured by Nihon Densi KK).

By the term "the ratio of isotactic pentad (mmmm)" is meant an isotactic ratio in terms of pentad unit in the polypropylene molecular chain measured by $^{13}C$ nuclear magnetic resonance spectra proposed by A. Zambelli et al. Macromolecules 6, 925 (1973); the signals in the measurement of $^{13}C$ nuclear magnetic resonance spectra being assigned according to the method proposed in A. Zambelli et al. Macromolecules 8, 687 (1975).

The ratio of isotactic pentad (mmmm) of the characteristic factor (1) is, as referred to above, a rate of 5 consecutive monomeric propylene units in meso-connection existent in the total propylene monomeric units in polypropylene. Thus, the isotactic property is higher as the ratio of isotactic pentad is higher. In propylene of the present invention, a ratio of isotactic pentad (mmmm) is 0.900–0.949, preferably 0.920–0.949, and more preferably 0.930–0.949.

The term "the 2,1- and 1,3-propylene unit in the polymer chain" means a rate of the 2,1- and 1,3-propylene units existing in the polypropylene molecular chain measured by $^{13}C$ nuclear magnetic resonance spectra in accordance with the method proposed by A. Tsusui, Polymer 30, 1350 (1989).

The 2,1- and 1,3-propylene units of the characteristic factor (2) is 0–1 mole %, preferably 0.1–0.7 mole %, and more preferably 0.2–0.5 mole %.

It can be confirmed that the primary structure of polypropylene according to the present invention is extremely highly controlled by the characteristic factors (1) and (2).

Among the characteristic factors of polypropylene, (3) a weight average molecular weight (Mw) and (4) a ratio of a weight average molecular weight (Mw) to a number average molecular weight (Mn), i.e. (Mw/Mn) is calculated according to a measuring result of gel permeation chromatography (GPC) in accordance with the following method: Using a mixed polystyrene gel column (for example, PSK gel GMH6-HT manufactured by Toso KK), an o-dichlorobenzene solution containing a polymer at a concentration of 0.05% by weight is measured at 135° C. A GPC-150 manufactured by Waters Corp. is used, for example, as a measuring apparatus.

A weight average molecular weight (Mw) which is the characteristic factor (3) for polypropylene of the present invention is 40,000–1,000,000, preferably 100,000–1,000,000.

A ratio of a weight average molecular weight (Mw) to a number average molecular weight (Mn), i.e., (Mw/Mn) which is the characteristic factor (3) for polypropylene of the present invention is 1.5–3.8.

Due to the characteristic factors for polypropylene according to the present invention, especially the characteristic factors (1) and (2), the melting point of polypropylene of the present invention is 147–160° C., preferably 150–158° C., and more preferably 152–158° C.

A melting point of the polymers or copolymers is measured by a DSC7 type Differential Scanning Calorimeter (manufactured by Perkin-Elmer Inc.) according to the method wherein polypropylene is heated from room temperature at a heat elevation rate of 30° C./min. up to 230° C., maintained at the same temperature for 10 minutes, then reduced in temperature at a rate of −20° C./min. down to −20° C., maintained at the same temperature for 10 minutes and again heated at a rate of 20° C./min. whereby a temperature showing a peak of melting is determined as melting point (Tm).

The characteristic factor (5) of the present invention is characterized in that in the case of elevating the temperature of o-dichlorobenzene continuously or stepwise up to given temperatures to measure the amount of eluted polypropylene, the position of a main elution peak [Ep(P)] is 95° C.–110° C., more preferably 100° C.–110° C., and the amount of components (E±10) existing in the range of ±10° C. of the main elution peak is at least 90%, more preferably 95% of the total amounts of components eluted at a temperature higher than 0° C.

A measuring condition for the characteristic factor (5) is as follows:

A tube made of stainless steel having a length of 15 cm and an inner diameter of 0.46 cm fully filled with glass beads of 0.1 m/mφ is used as a separation column. This column is maintained at 140° C. A polymer or copolymer is dissolved at about 140° C. in o-dichlorobenzene so that the concentration may become 2 mg/ml to form a solution. 0.5 ml of a test sample of the resultant solution is introduced into the column and kept retrained. The temperature of the column is allowed to depress down to 0° C. at a cooling rate of 1° C./min. whereby the polymer in the test sample is precipitated on the glass beads in the column. While the temperature of the column is maintained at 0° C., o-dichlorobenzene kept at 0° C. is allowed to flow in the column for 2 minutes at a flow rate of 1 ml/min. whereby polymer soluble in the solvent is extracted to form an extract solution. Next, the molecular weight distribution of polymer in the extract solution is measured by way of an IR-detector (wave length: 3.42 μm). The temperature is then elevated 3 times in stepwise fashion by 10° C. at 0–50° C., by 5° C. at 50–90° C. and by 3° C. at 90–140° C., and the above treat extracted amount of the polymer is measured at each temperature and the weight ratio of each fraction and the molecular weight are then measured.

By the term "the position of main elution peak [Ep(P)]" is meant that in an elution curve showing a relation between elution temperature (° C.) and eluted amount (% by weight), a peak position (temperature) is shown where the eluted amount becomes maximum. The characteristic factor of the present invention that the amount of the components existing in the range of ±10° C. of the main eluted peak (E±10) is at least 90%, more preferably 95% of the total amounts of components eluted at a temperature higher than 0° C., apparently shows a character that the distribution of crystallinity of the polypropylene of the present invention is narrower.

Details of the above fractionation is disclosed in the Journal of Applied Polymer Science: Applied Polymer Symposium 52, 145–158 (1993) by T. Usami et al.

A propylene-ethylene copolymer furnished with the specific factors (a), (b) and (c) of the present invention can be obtained by the aid of the catalyst preferably employed in the present invention as a propylene-ethylene copolymer containing ethylene within the range of at least 10% by weight but not exceeding 50% and containing 90–50% by weight of propylene. A propylene-ethylene copolymer satisfying the specific factors (a), (b) and (d) can be obtained by the aid of the catalyst preferably employed in the present invention as a propylene-ethylene copolymer containing 50–90% by weight of ethylene and 50–10% by weight of propylene, preferably 50–80% by weight of ethylene and 50–20% by weight of propylene.

Examples of the α-olefin contained in the propylene-α-olefin copolymer include α-olefins having from 2–12 carbon atoms. Preferable are ethylene, 1-butene, 4-methyl-1-pentene, 1-heptene, 1-hexene, and 1-octene. Especially preferable is ethylene. For the propylene-α-olefin copolymer, propylene and not only one α-olefin but also at least two α-olefins may be copolymerized. A copolymer containing not more than 10% by weight of a copolymerized polyene may also be utilized.

Among the specific factors required for the propylene-α-olefin copolymer concerned with the present invention, (a) a weight average molecular weight (Mw) and a ratio of a weight average molecular weight (Mw) to a number average molecular weight (Mn), i.e., (Mw)/(Mn) is calculated from a result of measurement of gel permeation chromatography (GPC) according to the following method:

Using a mixed polystyrene gel column (for example, PSK gel GNM6-HT manufactured by Toso KK), an o-dichlorobenzene solution containing a polymer at a concentration of 0.05% by weight is measured at 135° C. A GPC-150 manufactured by Waters Corp. is used, for example, as a measuring apparatus.

A weight average molecular weight (Mw) which is a specific factor (a) for the propylene-α-olefin copolymer of the present invention is 30,000–1,000,000, preferably 10,000–1,000,000.

A ratio of a weight average molecular weight (Mw) to a number average molecular weight (Mn), i.e. (Mw)/(Mn) which is a specific factor (b) for the propylene-ethylene copolymer of the present invention is 1.5–3.8.

A specific factor (c) of the propylene-ethylene copolymer of the present invention is characterized in that upon elevating the temperature of o-dichlorobenzene continuously or stepwise up to given temperatures to measure the amount of eluted propylene-ethylene copolymer at each temperature, an amount of the component eluted below 0° C. [E(R)] is at least 80% by weight, preferably at least 90% by weight of the total amounts of components eluted. Further, a specific factor (d) for the propylene-ethylene copolymer of the present invention is characterized in that an amount of the component eluted above 0° C. [E(E)] is at least 50% by weight, preferably at least 80% by weight of the total amounts of components eluted. It is also preferable that the position of a main elution peak is within the range from 0° C. to 95° C.

The amount of the component eluted [E(R)] in the specific factor (c) and the amount of the component eluted [E(E)] in the specific factor (d) are obtained by measurement under the same measuring conditions as in the characteristic factor (5).

By the term "the amount of component eluted [E(R)]" is meant that in an elution curve showing the relation between elution temperature (° C.) and amount of component eluted (% by weight), [E(R)] shows an amount of component eluted below 0° C. in terms of percentage by weight relative to the total amount of component eluted. The propylene-ethylene copolymer of the present invention is featured by the fact that an amount of component eluted below 0° C. is at least 80% by weight, preferably at least 90% by weight of the total amounts of components eluted. The fact that a larger amount of component eluted below 0° C. means low crystallinity of the relevant propylene-ethylene copolymer.

Likewise, the term "the amount of component eluted [E(E)]" means that in an elution curve showing the relation between elution temperature (° C.) and amount of component eluted (percentage by weight), [E(E)] shows an amount of component eluted above 0° C. in terms of percentage by weight relative to the total amounts of components eluted. The propylene-ethylene copolymer of the present invention is characterized by the fact that an amount of component eluted above 0° C. is at least 50% by weight, preferably at least 80% by weight and more preferably at least 90% by weight of the total amounts of components eluted. It is preferable that the position of a main elution peak is within the range from 0° C. to 95° C.

Any of the compositions may be used in the present invention so far as they satisfy the aforesaid specific and characteristic factors. However, preferable is a composition wherein a temperature (Tβ') showing the maximum value of tan-δ in β'-dispersion measured by a dynamic viscoelasticity measuring device is at least −65° C. but not higher than −10° C., more preferably at least −65° C. but not higher than −50° C., and a half-width at the Tβ' [(T β'(½)] is not higher than 20° C.

In another polypropylene composition of the present invention, a temperature (Tβ') showing the maximum value of tan-δ in β' dispersion measured by a dynamic viscoelasticity measuring device is at least −40° C. but not higher than −10° C., preferably within the range from −15° C. to −35° C.

The tan-δ is measured according to a dynamic viscoelasticity measuring device. An example of the measuring device is Rheovibron DDV-III-EP (manufactured by Orientec Inc.). A measuring condition of tan-δ is as follows: A polypropylene composition is compression-molded at 200° C. by a compression molding machine to make a test sample of 1 mm in thickness, 5–10 mm in width and 50 mm in length. The test sample thus obtained is measured by a dynamic viscoelasticity measuring device using a measuring frequency of 110 Hz whereby a measuring temperature is elevated from −150° C. to +250° C. by a rate of 2° C./min. to measure tan-δ of the test sample at each measuring temperature. In a tan-δ curve thus obtained, there are 4 dispersion peaks.

These peaks are called α dispersion, β dispersion, β' dispersion and γ dispersion in the order of higher temperature, and a temperature of tan-δ showing the maximum value in each dispersion is represented by Tα, Tβ, Tβ' and Tγ. Among these, the β' dispersion is assigned to the glass transition of the chain sequence with high randomness of propylene and ethylene in the polypropylene composition. The fact that Tβ' is lower means that a glass transition temperature of the chain sequence with high randomness is low, or in other words, a relevant composition possesses an excellent low temperature impact-strength. In the β' dispersion defined in the present invention which is measured by a dynamic viscoelasticity measuring device, a temperature of tan-δ showing the maximum value (Tβ-') is generally deemed as a peak value in β dispersion on the curve of tans-δ. In a half-width [Tβ'(½)] of this peak, more precisely, a narrower width in a position of a half height of the Tβ' peak shows a uniform chain sequence with high randomness.

In case the β dispersion and the β' dispersion exist in relatively adjacent positions, the maximum value of tan-δ in the β' dispersion is at an appearance covered with a peak of a curve showing the β dispersion so far as a curve of the tan-δ is observed so that the maximum value of the tan-δ in the β' dispersion cannot be observed visibly as a protuberant portion on the curve. Even in this case, however, it is possible to identify the position of the maximum value of tan-δ in β' dispersion in relation to the curve of β dispersion on the curve.

As to the details of the viscoelasticity, reference is made to L. Wanga et al., Journal of Polymer Science: Part B: Polymer Physics, Vol. 28, 937–949 (1990).

The polypropylene composition of the present invention is featured by comprising 20–95% by weight of the aforesaid polypropylene and 5–80% by weight of a propylene-α-olefin copolymer.

In case the proportion of the propylene and the propylene-α-olefin copolymer is within the above range, the final composition has good balance of the physical properties, and moldings obtained therefrom possess excellent impact-strength, especially low temperature impact-strength, rigidity, heat resistance and transparency thereby achieving the object of the present invention.

No limitation exists in the process for producing the polypropylene composition of the present invention as long as the above characteristic factors are satisfied. Examples of the process for producing the composition of the present invention include a process wherein polypropylene and propylene-α-olefin copolymer are individually produced by polymerization and then mixed together by means of an ordinary mixer, or a multi-stage polymerization process wherein copolymerization of propylene and an α-olefin is carried out subsequent to the polymerization of propylene provided that the catalyst is mixed.

An especially preferable polypropylene composition is obtainable by carrying out a first stage polymerization of propylene by the aid of a specific metallocene catalyst system followed by a second stage copolymerization of propylene and an α-olefin.

Below is an explanation of the process for production of the composition.

The metallocene catalyst system used in the present invention is comprised predominantly of the following compounds (A), (B), (C) and (D). More specifically, the catalyst system is a carrier-type catalyst component system constructed as main components comprising the compounds (A) and (B) carried on the compound (C) and a compound (D) which is separately added to the reaction system as a scavenger at the time of polymerization.

The compound (A): a transition metal compound of the following general formula:

$Q(C_5H_{4-m}R^1_m)(C_5H_{4-n}R^2_n)MXY$ wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site of $R^1$ and $R^2$ on the cyclopentadienyl rings should take a configuration where any symmetrical plane containing M is absent and that $R^1$ or $R^2$ is exist in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$, M stands for a transition metal Ti, Zr or Hf, and X and Y may be the same or different and each stands for a hydrogen atom, a halogen atom or a hydrocarbon group, The compound (B): an aluminoxane, The compound (C): a finely particulate carrier, and The compound (D): an organoaluminum compound.

Examples of the compound (A) include any of the compounds involved in the above definition. Illustrative of the compound (A) are, for example, dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, and dimethylsilylene(2,3,5-trimethylcyclopentadienyl)(2',4',5'-trimethylcyclopentadienyl)hafnium dimethyl. Especially preferable is dimethylsilylene(2,3,5-trimethylcyclopentadienyl)(2',4',5'-trimethylcyclopentadienyl)zirconium dichloride.

The aluminoxane of the compound (B) means an organoaluminum compound of the following general formula [1] or [2]:

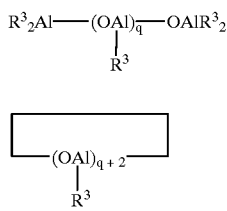

In these formulas, $R^3$ stands for a hydrocarbon group with 1–6, preferably 1–4 carbon atoms, more particularly, an alkyl group such as methyl, ethyl, propyl, butyl, isobutyl, pentyl or hexyl group; an alkenyl group such as allyl, 2-methylallyl, propenyl, isopropenyl, 2-methyl-1-propenyl or butenyl group; a cycloalkyl group such as cyclopropyl, cyclobutyl, cyclopentyl or cyclohexyl group; and an aryl group. Among these groups, an alkyl group is especially preferable. Each of $R^3$ groups may be the same or different. The notation q stands for an integer of 4–30, preferably 6–30, more preferably 8–30.

The aforesaid aluminoxane can be prepared in any of the known methods under various conditions. More particularly, the following methods can be illustrated:

(1) A method wherein a trialkylaluminum is reacted directly with water, using an organic solvent such as toluene or ether, (2) A method wherein a trialkylaluminum is reacted with a salt containing water of crystallization, for example, cupric sulfate hydrate, aluminum sulfate hydrate, etc., (3) A method wherein a trialkylaluminum is reacted with silica gel impregnated with water, (4) A method wherein trimethylaluminum is mixed with triisobutylaluminum and the mixture is reacted directly with water, using an organic solvent such as toluene or ether, (5) A method wherein trimethylaluminum is mixed with triisobutylaluminum and the mixture is reacted with a salt containing water of crystallization, for example, cupric sulfate hydrate or aluminum sulfate hydrate, and (6) A method wherein silica gel or the like is impregnated with water, then reacted with triisobutylaluminum, and thereafter with trimethylaluminum.

Inorganic carriers or organic carriers which are a granular or spherical particulate solid having a particle diameter of 1–500 μm, preferably 5–300 μm are used as the fine particulate carrier of the compound (C).

An oxide is preferably used as the aforesaid finely particulate inorganic carrier. More particularly, illustrative are, for example, $SiO_2$, $Al_2O_3$, MgO, $ZrO_2$, $TiO_2$ and a mixture of these oxides. Among these oxides, a carrier containing as a main ingredient at least one selected from the group consisting of $SiO_2$, $Al_2O_3$, and MgO is preferable. These inorganic oxide carriers are usually employed after they are baked for 1–40 hours at 100–1000° C. Instead of baking, a chemical dehydrating method using, for example, $SiCl_4$, chlorosilane, etc. may be employed. Above all, illustrative of the inorganic compound utilizable as the carrier are $SiO_2$, $Al_2O_3$, MgO, $TiO_2$, ZnO, etc. or a mixture of these, for example, $SiO_2$—$Al_2O_3$, $SiO_2$—MgO, $SiO_2$—$TiO_2$, $SiO_2$—$Al_2O_3$—MgO, etc. Among these, carriers chiefly containing $SiO_2$ or $Al_2O_3$ are preferable.

Further, examples of the finely particulate organic carrier include finely particulate organic polymers, for example, finely particulate polyolefin such as polyethylene, polypropylene, poly-1-butene, and poly-4-methyl-1-pentene and finely particulate polymers such as polystyrene.

The aforesaid carrier-type catalyst component comprising the compounds (A), (B) and (C) can be obtained by reacting the compound (A) with the compound (B) in the presence of the compound (C). Usually, hydrocarbon-soluble metallocene compound and aluminoxane are converted into a desired supported catalyst by allowing them to deposit on a dehydrated support. The order of adding the metallocene compound and the aluminoxane may freely be changed. For example, the metallocene compound dissolved in an adequate hydrocarbon solvent can initially be added to the support and thereafter the aluminoxane can be added thereto. Alternatively, the aluminoxane and the metallocene compound are previously reacted together and added to the support at the same time. It is also possible to add the aluminoxane initially to the support and then add the metallocene compound thereto. The temperature of the reaction is usually −20–100° C., preferably 0–100° C. while the time required for the reaction is usually at least 0.1 minute, preferably within the range of 1–200 minutes. The supported catalyst can be used if needed after preliminary polymerization with a small amount of an olefin.

Examples of an olefin used for the preliminary polymerization include ethylene, propylene, 1-butene, 1-hexene, 3-methyl-1-butene, 4-methyl-1-pentene, etc. At least two of these monomers may be copolymerized.

Examples of the compound (D) used as a scavenger include triethylaluminum, triisopropylaluminum, triisobutylaluminum, tri-n-butylaluminum, tri-n-hexylaluminum, and diisopropylaluminum hydride. Most preferable are triethylaluminum and triisobutylaluminum. At least two of these organoaluminum compounds may concurrently be used.

A variety of polymerization processes can be employed such as a slurry polymerization process wherein propylene is polymerized or copolymerized in an inert solvent, for example, an aliphatic hydrocarbon such as butane, pentane, hexane, heptane or isooctane; a alicyclic hydrocarbon such as cyclopentane, cyclohexane or methylcyclohexane; an aromatic hydrocarbon such as toluene, xylene or ethylbenzene; gasoline fractions or a hydrogenated diesel oil, a bulk polymerization process wherein propylene monomer per se is used as a solvent, a vapor phase polymerization process wherein polymerization of propylene is carried out in a vapor phase, a solution polymerization process wherein the resultant polymer or copolymer of propylene formed by polymerization is liquid, or a polymerization process wherein at least two of these polymerization processes are combined.

A specific catalyst thus prepared and preferably employed for the present invention or as preliminarily activated can be used for polypropylene polymerization at the first stage. The conditions for polymerization at the first stage are the same as those carried out by the aid of a known conventional Ziegler catalyst. More precisely, the polymerization temperature is from −50° C. to 150° C., preferably from −10° C. to 100° C. and more preferably 40–80° C., while the polymerization pressure is from atmospheric pressure to 7 MPa, preferably from 0.2 MPa to 5 MPa. The polymerization time is usually from 1 minute to about 20 hours. Further, regulation of the molecular weight of the obtained polypropylene is attained by suitably selecting the above polymerization conditions or by introducing a molecular weight regulator such as hydrogen into the reaction system.

In the aforesaid first stage polymerization, it is necessary to regulate the polymerization condition so that polypropylene satisfying all of the aforesaid factors (1)–(5) may be contained in the proportion of 20–95% by weight of the total polymers. The polymerization at the first stage can be carried out stepwise.

Successive to the first stage polymerization, copolymerization of propylene and an α-olefin other than propylene is carried out in one shot or stepwise under a similar condition as in the first stage. The one shot of polymerization means intermission of continuous or temporary supply of the monomer.

In the second stage copolymerization, it is necessary to regulate the copolymerization condition so that a propylene-α-olefin copolymer containing 10–90% by weight of an α-olefin other than propylene may be contained in the proportion of 5–80% by weight of the total polymers.

After completion of the second stage polymerization, a known conventional catalyst deactivation treatment, a step for eliminating catalyst residues, a drying step and the like after-treatment are carried out to obtain the polypropylene composition of the present invention.

The polypropylene composition of the present invention may be incorporated with various additives such as antioxidants, UV-absorbing agents, antistatic agents, nucleating agents, lubricating agents, incombustible agents, antiblocking agents, coloring agents, inorganic or organic fillers, or with various synthetic resins so far as the object of the present invention is not damaged. Usually, the composition is subjected to heating followed by melt-kneading and then to cutting to form granular pelletized chips for manufacturing various moldings.

Illustrative of the nucleating agent, e.g., α-form nucleating agent are, for example, inorganic substances or compounds such as talc, alum, silica, titanium oxide, calcium oxide, magnesium oxide, carbon black and clay minerals; carboxylic acids excluding aliphatic monocarboxylic acids such as malonic acid, succinic acid, adipic acid, maleic acid, azelaic acid, sebacic acid, dodecanedicarboxylic acid, citric acid, butanetricarboxylic acid, naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexenecarboxylic acid, 4-cyclohexene-1,2-dicarboxylic acid, benzoic acid, methylbenzoic acid, dimethylbenzoic acid, ethylbenzoic acid, 4-tert-butylbenzoic acid, salicylic acid, phthalic acid, trimellitic acid and pyromellitic acid; salts or basic salts thereof such as lithium, sodium, potassium, magnesium, calcium, strontium, barium, zinc and aluminum salts or basic salts; dibenzylidenesorbitol compounds such as 1,2, 3.4-dibenzylidenesorbitol, 1.3-benzylidene-2.4-p-methylbenzylidenesorbitol, 1.3-benzylidene-2.4-p-ethylbenzylidenesorbitol, 1.3-p-methyl-benzylidene-2.4-benzylidenesorbitol, 1.3-p-ethyl-benzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-bis(p-methylbenzylidene)sorbitol, 1.3,2.4-bis(p-ethylbenzylidene)sorbitol, 1.3,2.4-bis(p-n-propylbenzylidene)sorbitol, 1.3,2.4-bis(p-isopropylbenzylidene)sorbitol, 1.3,2.4-bis(p-n-butylbenzylidene)sorbitol, 1.3,2.4-bis(p-sec-butylbenzylidene)sorbitol, 1.3,2.4-bis(p-tert-butylbenzylidene)sorbitol, 1.3-(2',4'-dimethylbenzylidene)-2.4-benzylidenesorbitol, 1.3-benzylidene-2.4-(2',4'-dimethylbenzylidene)sorbitol, 1.3,2.4-bis(3',4'-dimethylbenzylidene)sorbitol, 1.3,2.4-bis(p-methoxybenzylidene)sorbitol, 1.3,2.4-bis(p-ethoxybenzylidene)sorbitol, 1.3-benzylidene-2.4-p-chlorobenzylidenesorbitol, 1.3-p-chlorobenzylidene-2.4-benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol and 1.3,2.4-bis(p-chlorobenzylidene)sorbitol; arylphosphate compounds such as lithium bis(4-tert-butylphenyl)phosphate, sodium bis(4-tert-butylphenyl)phosphate, lithium bis(4-cumylphenyl)phosphate, sodium bis(4-cumylphenyl)phosphate, potassium bis(4-tert-butylphenyl)phosphate, calcium mono-4-tert-butylphenyl phosphate, calcium bis(4-tert-butylphenyl)phosphate, magnesium mono-4-tert-butylphenyl phosphate, magnesium bis(4-tert-butylphenyl)phosphate, zinc mono(4-tert-butylphenyl)phosphate, zinc bis(4-tert-butylphenyl)phosphate, aluminum dihydroxy-(4-tert-butylphenyl)phosphate, aluminum hydroxy-bis(4-tert-butylphenyl)phosphate, aluminum tris(4-tert-butylphenyl)phosphate, sodium 2,2'-methylene-bis(4,6-di-tert-butylphenyl)phosphate, sodium 2,2'-ethylidene-bis(4,6-di-tert-butylphenyl)phosphate, sodium 2,2'-methylene-bis(4-cumyl-6-tert-butylphenyl)phosphate, lithium 2,2'-methylene-bis(4,6-di-tert-butylphenyl)phosphate, lithium 2,2'-ethylidene-bis(4,6-di-tert-butylphenyl)phosphate, lithium 2,2'-methylene-bis(4-isopropyl-6-tert-butylphenyl)phosphate, lithium 2,2'-methylene-bis(4-methyl-6-tert-butylphenyl)phosphate, lithium 2,2'-methylene-bis(4-ethyl-6-tert-butylphneyl)phosphate, sodium 2,2'-butylidene-bis(4,6-di-tert-butylphenyl)phosphate, sodium 2,2'-tert-octylmethylene-bis(4,6-dimethylphenyl)phosphate, sodium 2,2'-tert-octylmethylene-bis(4,6-di-tert-butylphenyl)phosphate, sodium 2,2'-methylene-bis(4-methyl-6-tert-butylphenyl)phosphate, sodium 2,2'-methylene-bis(4-ethyl–6-tert-butylphenyl)phosphate, sodium (4,4'-dimethyl-6,6'-di-tert-butyl-2,2'-biphenyl)phosphate, sodium 2,2'-ethylidene-bis(4-sec-butyl-4-tert-butylphenyl)phosphate, sodium 2,2'-methylene-bis(4,6-dimethylphenyl)phosphate, sodium 2,2'-methylenebis(4,6-diethylphenyl)phosphate, potassium 2,2'-ethylidene-bis(4,6-di-tert-butylphenyl)phosphate, calcium bis[2,2'-methylene-bis(4,6-di-tert-butylphenyl)phosphate], magnesium bis[2,2'-methylene-bis(4,6-di-tert-butylphenyl)phosphate], zinc bis[2,2'-methylene-bis(4,6-di-tert-butylphenyl)phosphate], aluminum tris-[2,2'-methylene-bis(4,6-di-tert-butylphenyl)phosphate], calcium bis[2,2'-methylene-bis(4-methyl-6-tert-butylphenyl)phosphate], calcium bis[2,2'-ethylidene-bis(4,6-di-tert-butylphenyl)phosphate], calciumbis[2,2'-thio-bis(4-methyl-6-tert-butylphenyl)phosphate], calcium bis [2,2'- thio-bis(4-ethyl-6-tert-butylphenyl)phosphate], calcium bis [2,2'-thio-bis(4,6-di-tert-butylphenyl)phosphate], magnesium bis[2,2'-thio-bis(4,6-di-tert-butylphenyl)phosphate], magnesium bis[2,2'-thiobis(4-tert-octylphenyl)phosphate], barium bis [2,2'-methylene-bis(4,6-di-tert-butylphenyl) phosphate], calcium bis[(4,4'-dimethyl-6,6'-di-tert-butyl-2, 2'-biphenyl)phosphate], magnesium bis[2,2'-ethylidene-bis (4,6-di-tert-butylphenyl)phosphate], barium bis[2,2'-ethylidene-bis(4,6-di-tert-butylphenyl)phosphate] aluminum tris[2,2'-ethylidene-bis(4,6-di-tert-butylphenyl) phosphate], aluminum dihydroxy-2,2'-methylene-bis(4,6-di-tert-butylphenyl)phosphate, aluminum dihydroxy-2,2'-methylene-bis(4-cumyl-6-tert-butylphenyl)phosphate, aluminum hydroxy-bis [2,2'-methylene-bis(4,6-di-tert-butylphenyl)phosphate], aluminum hydroxy-bis[2,2'-methylene-bis(4-cumyl-6-tert-butylphenyl)phosphate], titanium dihydroxy-bis [2,2'-methylene-bis(4,6-di-tert-butylphenyl)phosphate], tin dihydroxy-bis [2,2'-methylene-bis(4,6-di-tert-butylphenyl)phosphate], zirconium oxy-bis [2,2'-methylene-bis(4,6-di-tert-butylphenly)phosphate], aluminum dihydroxy-2,2'-methylene-bis-(4-methyl-6-tert-butylphenyl)phosphate], aluminum hydroxy-bis [2,2'-methylene-bis(4-methyl-6-tert-butylphenyl)phosphate], aluminum dihydroxy-2,2'-ethylidene-bis(4,6-di-tert-butylphenyl)phosphate], and aluminum hydroxy-bis[2,2'-ethylidene-bis(4,6-di-tert-butylphenyl)phosphate]; mixtures of cyclic polyvalent metal aryl phosphate compounds among the aforesaid aryl phosphate compounds with alkali metal salts of aliphatic monocarboxylic acids (e.g., lithium, sodium or potassium salt of acetic acid, lactic acid, propionic acid, acrylic acid, octanoic acid, isooctanoic acid, nonanoic acid, decanoic acid, lauric acid, myristic acid, palmitic acid, stearic acid, oleic acid, linolic acid, linolenic acid, 12-hydroxy-stearic acid, ricinolic acid, behenoic acid, erucic acid, montanoic acid, melissic acid, stearoyllactic acid, β-dodecylmercaptoacetic acid, β-dodecylmercaptopropionic acid, β-N-methyl-N-lauroylaminopropionic acid, etc.) or basic aluminum lithium hydroxy carbonate hydrate; and high molecular compounds such as poly(3-methyl-1-butene), poly(3-methyl-1-pentene), poly(3-ethyl-1-pentene), poly(4-methyl-1-pentene), poly(4-methyl-1-hexene), poly(4,4-dimethyl-1-pentene), poly(4,4-dimethyl-1-hexene), poly(4-ethyl-1-hexene), poly(3-ethyl-1-hexene), poly(allylnaphthalene), poly(allylnorbomane), atactic polystyrene, syndiotactic polystyrene, poly (dimethylstyrene), poly(vinylnaphthalene), poly (allylbenzene), poly(allyltoluene), poly(vinylcyclopentane), poly(vinylcyclohexane), poly(vinylcycloheptane), poly (vinyltrimethylsilane) and poly(allyltrimethylsilane).

Among these compounds or substances, preferable are talc, aluminum hydroxy-bis(4-tert-butylbenzoate), 1.3,2.4-dibenzylidenesorbitol, 1.3,2.4-bis(p-methylbenzylidene) sorbitol, 1.3,2.4-bis(p-ethylbenzylidene)sorbitol, 1.3,2.4-bis (2',4'-dimethylbenzylidene)sorbitol, 1.3,2.4-bis(3',4'-dimethylbenzylidene)sorbitol, 1.3-p-chlorobenzylidene-2.4-p-methylbenzylidenesorbitol, 1.3,2.4-bis(p-chlorobenzylidene)sorbitol, sodium bis(4-tert-butylphenyl) phosphate, sodium 2,2'-methylene-bis(4,6-di-tert-butylphenyl)phosphate; a mixture of a polyvalent metal cyclic arylphosphate such as calcium 2,2'-methylene-bis(4, 6-di-tert-butylphenyl)phosphate, aluminum 2,2'-methylene-bis(4,6-di-tert-butylphenyl)phosphate, aluminum dihydroxy-2,2'-methylene-bis(4,6-di-tert-butylphenyl) phosphate, or aluminum hydroxy-bis[2,2'-methylene-bis(4, 6-di-tert-butylphenyl)phosphate] with an alkali metal salt of an aliphatic monocarboxylic acid; and poly(3-methyl-1-butene), polyvinylcyclohexane or polyallyltrimethylsilane.

These α-form nucleating agents may be used singly or in combination of at least two α-form nucleating agents. The proportion of the α-form nucleating agent to the polypropyene composition varies according to the required rigidity, heat resistance and transparency, but usually 0.0001–1 parts by weight, preferably 0.01–0.5 parts by weight and more preferably 0.05–0.3 parts by weight per 100 parts by weight of crystalline propylene homopolymer.

The radical generator preferably does not have too low a decomposition temperature for obtaining a homogeneous composition. Accordingly, it has a decomposition temperature of at least 79° C., preferably at least 100° C. for obtaining a half-life of 10 hours. Illustrative of the radical generator are, for example, organic peroxides such as benzoyl peroxide, tert-butyl peroxide, tert-butyl peracetate, tert-butyl-peroxyisopropyl carbonate, 2,5-dimethyl-2,5-di (benzoylperoxy)hexane, 2,5-dimethyl-2,5-di (benzoylperoxy)hexine-3, tert-butyl-di-peradipate, tert-butylperoxy-3,5,5-trimethylhexanoate, methyl ethyl ketone peroxide, cyclohexanone peroxide, di-tert-butyl peroxide, dicumyl peroxide, 2,5-dimethyl-2,5-di(tert-butylperoxy) hexane, 2,5-dimethyl-2,5-di(tert-butylperoxy)hexine-3,1,3-bis(tert-butylperoxyisopropyl)benzene, tert-butylcumyl peroxide, 1,1-bis(tert-butylperoxy)-3,3,5-trimethylcyclohexane, 2,2-bis(tert-butylperoxy)butane, p-menthane hydroperoxide, diisopropyl-benzene hydroperoxide, cumene hydroperoxide, tert-butyl hydroperoxide, p-cymene hydroperoxide, 1,1,3,3-tetramethylbutyl hydroperoxide, 2,5-dimethyl-2,5-di(hydroperoxy)hexane, trimethylsilyl-cumyl peroxide, 2,5-dimethyl-2,5-bis(trimethylsilylperoxy) hexane, 2,5-dimethyl-2,5-bis(trimethylsilylperoxy)hexine-3 and 1,3-bis(trimethylsilylperoxyisopropyl)benzene. Especially preferable are 2,5-dirnethyl-2,5-di(tert-butylperoxy) hexane, 2,5-dimethyl-2,5-di(tert-butylperoxy)hexine-3 and 1,3-bis(tert-butylperoxyisopropyl)benzene. These radical generators may be used singly or in combination of at least two.

A proportion of the radical generator to the polypropylene composition of the present invention is such that 0.001–0.5 parts by weight, preferably 0.01–0.2 parts by weight of the radical generator is used per 100 parts by weight of the polypropylene composition.

These pelletized molding materials are molded according to various known conventional molding methods for polypropylene, for example, injection molding, extrusion molding, foam molding, hollow molding, etc. and can be used for various industrial injection moldings, various containers, non-stretched films, uniaxially stretched films, biaxially stretched films, sheets, pipes, filaments or fibers, and other moldings.

EXAMPLES

The present invention will now be illustrated in more detail by way of Examples and Comparative Examples. The definitions for technical terms and the method of measurement given in Examples and Comparative Examples are as follows:

(1) The ratio of isotactic pentad (mmmm): measured according to the aforesaid method, (2) Mis-insertion (2,1- and 1,3-propylene content): measured according to the above mentioned method, (3) Melting point (Tm): measured according to the aforesaid method, (4) Crystallizing temperature (Tc): Using DSC7 type Differential Scanning Calorimeter (manufactured by Perkin-Elmer), the crystallizing temperature of polymers and copolymers of olefins was measured according to the method wherein a sample of the polymer or copolymer was heated from room temperature up to 230° C. at a heat-elevation rate of 30° C./min., maintained at the same temperature for 10 minutes, then depressed in temperature down to −20° C. at a rate of −20° C./min., maintained at the same temperature for 10 minutes and again heated up to 230° C. at a temperature-elevation rate of 20° C./min., maintained at the same temperature for 10 minutes, depressed in temperature down to 150° C. at a rate of −80° C./min., and further depressed in temperature at a rate of −5° C./min. whereby a temperature showing the maximum peak at the time of crystallization was determined as the crystallization temperature (Unit: ° C.).

(5) Mw, Mn, and Mw/Mn were measured according to the aforesaid method.

(6) Ep(P), E(R), E(E), and E±10 were measured according to the aforesaid method.

(7) Tβ' and Tβ'(½) were measured according to the aforesaid method.

(8) Total light beam transmission rate (%): A test piece of 2 mm in thickness was prepared by injection molding and used for the test in accordance with JIS K7105 to obtain total light beam transmission rate.

(9) Flexural modulus (MPa): A propylene polymer in an amount of 100 parts by weight was mixed with 0.05 parts by weight of tetrakis [methylene(3,5-di-tert-butyl-4-hydroxy hydrocinnamate)]methane, 0.1 part by weight of tris(2,4-di-tert-butylphenyl)phosphite, and 0.1 part by weight of calcium stearate and pelletized by way of a uniaxial extrusion-pelletizer having a screw of 40 mmφ at an extrusion temperature of 230° C. The resultant propylene polymer pellets were then injection molded by the aid of an injection molding machine having a screw of 40 mmφ at a molten resin temperature of 250° C. and a metal mold kept at 50° C. to form a JIS size test piece, which was then tested in accordance with JIS K7113 and JIS K7203.

(10) Izod impact strength (J/m): Using a test piece with a notch prepared by injection molding in the same manner as described in the test condition of the aforesaid flexural modulus, a test was made in accordance with JIS K7110 at 23° C.

Example 1

[Preparation of a supported-type catalyst]

In a well dried 500 ml flask the air in which had been replaced with $N_2$ were placed 0.39 g, 0.889 mmole) of dimethylsilylene(2,3,5-trimethylcyclopentadienyl)-(2',4',5'-trimethylcyclopentadienyl)zirconium dichloride and 267 mmoles of methylaluminoxane diluted with toluene (in terms of Al atom). The mixture is reacted together for 10 minutes. To this reaction mixture was added 10 g of silica (marketed by Grace Davison) baked at 800° C. for 8 hours, and the mixture was stirred for 10 minutes. While making the flask vacuum from the top of the container, a very slight stream of nitrogen was introduced from the bottom. The mixture was then heated at 70° C. while the solvent was allowed to evaporate for a period of 8 hours. The resultant dried solid was cooled at room temperature overnight. In a well dried 500 ml flask the air in which was replaced with $N_2$ were placed the resultant solid catalyst and 250 ml of isopentane, and the mixture was cooled to 0° C. Ethylene was then added to the flask at a flow rate of 80 ml/min. continuously for 4 hours to effect preliminary polymerization. The supernatant liquid was then removed by decantation and the residue was washed four times with 1000 ml of isopentane by decantation. The residue was dried in vacuo for 2 hours at room temperature to prepare 35 g of a supported-type catalyst.

[Production of polypropylene composition]

In a 3 liter autoclave the air in which had been replaced sufficiently with nitrogen were placed 2 liters of liquefied propylene and 2 mmoles of triethylaluminum. The mixture was stirred for 15 minutes at 50° C. The supported-type catalyst in an amount of 400 mg as prepared above was then added to the mixture and a first stage polymerization was carried out for 1.5 hours while maintaining the inner temperature of the autoclave at 50° C. Unreacted propylene in the autoclave was then released. The air in the autoclave was then replaced twice with nitrogen and a portion of the polypropylene in the polymerization reactor was taken out for measuring the physical properties of the polypropylene. The inner temperature of the autoclave was then elevated up to 50° C. and a gas mixture comprising 63 mole % of ethylene and 37 mole % of propylene was introduced into the autoclave while maintaining the pressure in the reactor at 1.6 MPa. A second stage copolymerization of ethylene/propylene was carried out for one hour while maintaining the inner temperature of the autoclave at 50° C. After completion of the polymerization, unreacted monomers were released and the contents was taken out whereby 285 g of the polypropylene composition of the present invention was obtained.

Example 2

A polymerization was carried out in the same manner as described in Example 1 except that a proportion of the gas mixture in the second stage polymerization was changed to 92 mole % of ethylene and 8 mole % of propylene, thereby obtaining a polypropylene composition. In case of elevating the temperature of o-dichlorobenzene continuously or stepwise up to given temperatures to measure the amount of the resultant propylene-ethylene copolymer obtained in the second stage polymerization at each temperature, the position of the main elution peak was 35° C.

Table 2 shows the result of measuring physical properties of the resultant compositions.

Comparative Example 1

[Preparation of a supported-type catalyst]

A carrier type catalyst was prepared in the same manner as described in Example 1 except that dimethylsilylene-bis (2-methyl-4,5-benzoindenyl)zirconium dichloride was used as metallocene in place of dimethylsilylene(2,3,5-trimethylcyclopentadienyl)(2',4',5'-trimethylcyclopentadienyl)zirconium dichloride.

[Production of polypropylene composition]

Example 1 was repeated except that the carrier-type catalyst prepared as above was used in place of the supported-type catalyst prepared in Example 1 to obtain 329 g of a polypropylene composition.

Comparative Example 2

[Production of polypropylene composition]

Into a 100 liter autoclave equipped with a stirrer in which the air had been sufficiently replaced with nitrogen were placed 50 liters of n-hexane, 150 mmoles of triethylaluminum and 30 mmoles of diisopropyldimethoxysilane. To the mixture was added 1 mmole (in terms of Ti) of a titanium catalyst component carried on magnesium chloride obtained according to the method as described in Example 1 of Japanese Laid-open Patent Appln. No. Sho. 62-104812. The mixture was heated at 70° C. Hydrogen was then supplied to the autoclave so that a hydrogen partial pressure in the gas phase might be kept at 0.04 MPa, and propylene was continuously supplied for 4 hours so as to maintain the inner pressure of the autoclave at 0.8 MPa to conduct a first stage polymerization while keeping the temperature in the autoclave at 70° C. during the polymerization. After 4 hours, the inner temperature of the autoclave was reduced to 30° C. and unreacted propylene and hydrogen in the autoclave were allowed to release or escape therefrom. After twice replacing the air in the polymerization container with nitrogen, a portion of the slurry of polypropylene was taken out and dried to measure the physical properties of the resultant polypropylene. On measurement of the amount of 2,1- and 1,3-propylene unit existing in the resultant polypropylene chain, the amount was below the lower limit (0.02 mole %) of the detectable range of the measurement device.

Under such condition that the slurry of polypropylene containing the catalyst existed in the autoclave, 1.4 liters of hydrogen was successively supplied into the autoclave, the temperature in the autoclave was elevated up to 60° C. Into the autoclave were supplied 0.56 kg/hour of ethylene gas and concurrently 1.25 kg/hour of propylene gas, and a second stage copolymerization of ethylene/propylene was carried out for 2 hours. After completion of the second stage polymerization, the inner temperature of the autoclave was depressed down to 30° C. and unreacted hydrogen, ethylene and propylene were released out of the autoclave. A slurry in the autoclave was taken out, subjected to centrifugal separation to separate a large amount of the solvent, resulting in a polypropylene composition containing a small amount of the solvent. The polypropylene composition was then dried under heat with nitrogen heated at 100° C. to obtain powdery polypropylene composition.

Comparative Example 3

In Example 1, only the first stage polymerization was carried out to obtain a propylene homopolymer. Table 2 shows a result of measuring physical properties of the resultant homopolymer.

In the foregoing, Examples of the present invention are illustrated together with Comparative Examples. The above Example 1 is a preferable embodiment of a process for the production of propylene-ethylene copolymer containing a lower content of ethylene by the aid of a metallocene catalyst preferably used in the present invention and corresponds especially to claims 4 and 5 of the present invention.

As is evident from this Example, it is understood that the present invention provides a propylene-ethylene copolymer having excellent heat resistance and rigidity with a high level of low temperature impact strength never seen in the conventional art polymers. Example 2 is a preferable embodiment of a process for the production of a propylene-ethylene copolymer containing a high content of ethylene by the aid of a metallocene catalyst preferably used in the present invention and corresponds especially to claims 6–8 of the present invention.

In view of this embodiment, it is understood that in case of a propylene-ethylene copolymer of a higher ethylene content, there is provided a heat resistant propylene-ethylene copolymer improved in rigidity and transparency with an industrially advantageous level of impact-strength.

INDUSTRIAL UTILIZATION

As is evident from the foregoing Examples, the polypropylene composition of the present invention possesses a good balance of physical properties such as impact strength, especially low temperature impact-strength, rigidity, heat resistance and transparency, and so enables a broadening of the application field otherwise limited with conventional polypropylene.

TABLE 1

| | | Ex 1 | Com Ex 1 | Com Ex 2 |
|---|---|---|---|---|
| Polypropylene Component | (mmmm) | 0.941 | 0.901 | 0.964 |
| | M-I (mol %) | 0.43 | 1.56 | ND |
| | I of H R | 156.6 | 145.8 | 163.8 |
| | Tm (° C.) | | | |
| | Tc (° C.) | 114.5 | 108.8 | 101.0 |
| | Mw | 133800 | 228100 | 158000 |
| | Mw/Mn | 2.3 | 2.7 | 5.3 |
| | Ep (P) (° C.) | 108 | 96 | 118 |
| | E ± 10 (10%) | 97.0 | 93.6 | 62.3 |
| | Wt % | 79.0 | 77.0 | 83.8 |
| Propylene-α-Olefin Copolymer Component | α-Olefin (Ethylene) Content (Wt %) | 38.8 | 43.9 | 45.2 |
| | Mw/Mn | 2.2 | 2.0 | 6.7 |
| | E (R) (Wt %) | 100 | 100 | 66.5 |
| | Wt % | 21.0 | 23.0 | 16.2 |
| Polypropylene Composition | Tm (° C.) | 155.6 | 144.0 | 163.0 |
| | Tc (° C.) | 112.8 | 108.9 | 109.9 |
| | I of LTIS | −53 | −51 | −33 |
| | Tβ' (° C.) | | | |
| | Tβ' (½) (° C.) | 14 | 15 | 25 |
| | E or R FM (MPa) | 873 | 710 | 1011 |
| | E of T ALBT (%) | 44 | 39 | 40 |

TABLE 2

| | | Ex 2 | Com Ex 2 | Com Ex 3 |
|---|---|---|---|---|
| Polypropylene Component | (mmmm) | 0.941 | 0.964 | 0.941 |
| | M-I (mol %) | 0.43 | ND | 0.43 |
| | I of H R | 156.6 | 163.8 | 156.6 |
| | Tm (° C.) | | | |
| | Tc (° C.) | 114.5 | 101.0 | 114.5 |
| | Mw | 133800 | 158000 | 133800 |
| | Mw/Mn | 2.3 | 5.3 | 2.3 |
| | Ep (P) (° C.) | 108 | 118 | 108 |
| | E ± 10 (%) | 97.0 | 62.3 | 97.0 |
| | Wt % | 80.0 | 83.8 | 100.0 |
| Propylene-α-Olefin Copolymer Component | α-Olefin (Ethylene) Content (Wt %) | 68.0 | 45.2 | — |
| | Mw/Mn | 2.6 | 6.7 | — |
| | E (E) (Wt %) | 100 | 66.5 | — |
| | Wt % | 20.0 | 16.2 | 0 |
| | Tm (° C.) | 155.2 | 163.0 | 156.6 |
| | Tc (° C.) | 112.1 | 109.9 | 114.5 |
| Polypropylene Composition | I of LTIS | −18 | −33 | Absence of (β'-peak |
| | Tβ' (° C.) | | | |
| | E or R FM (MPa) | 1037 | 1011 | 1357 |
| | Izod IS (23° C.) (J/m) | 37 | 74 | 21 |
| | E of T ALBT (%) | 64 | 40 | 76 |

In Tables 1 and 2, the meaning of each abbreviation is as follows:
(1) "Ex" stands for Example.
(2) "Com Ex" stands for Comparative Example.
(3) "M-I" stands for Mis-insertion.
(4) "I of HR" stands for Index of Heat resistance.
(5) "I of LTIS" stands for Index of Low temperature impact strength.
(6) "E of R" stands for Evaluation of Rigidity
(7) "FM" stands for Flexural Modulus.

(8) "Izod IS" stands for Izod Impact strength
(9) "E of T" stands for Evaluation of Transparency.
(10) "ALBT" stands for All light beam transmission rate.

What is claimed is:

1. A polypropylene composition comprised of 20–95% by weight of a polypropylene defined in the following [I] and 5–80% by weight of a propylene-α-olefin copolymer defined in the following [II]:

[I] a polypropylene featured by having:
(1) a ratio of isotactic pentad (mmmm) is 0.900–0.949,
(2) the 2,1- and 1,3-propylene units in the polymer chain is 0–1 mole %,
(3) a weight average molecular weight (Mw) is 40,000–1,000,000,
(4) a ratio of a weight average molecular weight (Mw) to a number average molecular weight (Mn), i.e. (Mw)/(Mn) is 1.5–3.8, and
(5) in case of elevating the temperature of o-dichlorobenzene continuously or stepwise up to given temperatures to measure the amount of eluted polypropylene at each temperature, the position of a main elution peak is 95–110° C. and the amount of components existing in the range of ±10° C. of the main elution peak is at least 90% of the total amounts of components eluted at a temperature higher than 0° C. and

[II] a propylene-α-olefin copolymer containing 10–90% by weight of a constituent derived from propylene and 10–90% by weight of a constituent derived from α-olefin other than propylene.

2. A polypropylene composition according to claim 1, wherein the polypropylene [I] defined in (5) is as follows: in case of elevating the temperature of o-dichlorobenzene continuously or stepwise up to given temperatures to measure the amount of eluted polypropylene at each temperature, the position of a main elution peak is 95–110° C. and the amount of components (E±10) existing in the range of ±10° C. of the main elution peak is at least 95% of the total amounts of components eluted at a temperature higher than 0° C.

3. A polypropylene composition according to claim 1, wherein a melting point (Tm) of the polypropylene [I] is 147–160° C.

4. A polypropylene composition according to claim 1, wherein an α-olefin in the propylene-α-olefin copolymer [II] is ethylene and (a) a weight average molecular weight (Mw) is 30,000–1,000,000, (b) a ratio of a weight average molecular weight (Mw) to a number average molecular weight (Mn), i.e. (Mw)/(Mn) is 1.5–3.8, and (c) in case of elevating the temperature of o-dichlorobenzene continuously or stepwise, an amount eluted below 0° C. [E(R)] is at least 80% by weight of the total eluted amount.

5. A polypropylene composition according to claim 1, wherein in β' dispersion measured by a dynamic viscoelasticity measuring apparatus a temperature showing the maximum value of tan-δ being −65° C. to −40° C., and a half-width of the peak temperature [Tβ'(½)] is below 20° C.

6. A polypropylene composition according to claim 1, wherein the α-olefin in the propylene-α-olefin copolymer [II] is ethylene, (a) a weight average molecular weight (Mw) is 30,000–1,000,000, (b) a ratio of a weight average molecular weight (Mw) to a number average molecular weight (Mn), i.e. (Mw)/(Mn) is 1.5–3.8, (c) in case of elevating the temperature of o-dichlorobenzene continuously or stepwise, an amount eluted above 0° C. [E(E)] is at least 50% by weight of the total eluted amount.

7. A polypropylene composition according to claim 6, wherein E(E) is at least 80% by weight of the total eluted amount.

8. A polypropylene composition according to claim 1, wherein in a β'-dispersion measured in a dynamic viscoelasticity measuring apparatus, a temperature (Tβ') showing the maximum value of tan-δ is within the range of higher than −40° C. and not higher than −10° C.

9. A polypropylene composition according to claim 1, wherein the polypropylene [I] and the propylene-α-olefin copolymer [II] have been produced by the aid of a catalyst system comprised predominantly of the compounds (A), (B), (C), and (D) shown below: the compound (A) a transition metal compound of the general formula:

wherein $(C_5H_{4-m}R^1_m)$ and $(C_5H_{4-n}R^2_n)$ each stand for a substituted cyclopentadienyl group, m and n each stands for an integer of 1–3, $R^1$ and $R^2$ may be the same or different and each stands for a hydrocarbon group with 1–20 carbon atoms, a silicon-containing hydrocarbon group, with the proviso that the site of $R^1$ and $R^2$ on the cyclopentadienyl rings should take a configuration where any symmetrical plane containing M is absent and that $R^1$ or $R^2$ is existent in at least one carbon atom adjacent to the carbon atom connected to Q in at least one cyclopentadienyl ring, Q stands for a bivalent hydrocarbon radical, unsubstituted silylene radical or a hydrocarbon-substituted silylene radical bridging the groups $(C_5H_{4-m}R^1_m)$ and $(C_5H_{4-n}R^2_n)$, M stands for a transition metal Ti, Zr or Hf, and X and Y may be the same or different and each stands for a hydrogen atom, a halogen atom or a hydrocarbon group, the compound (B): an aluminoxane, the compound (C): a finely particulate carrier, and the compound (D): an organoaluminum compound.

10. A polypropylene composition according to claim 9, wherein the compound (A) is dimylsilylene(2,3,5-trimethylcyclopentadienyl)(2',4',5'-trimethyl-cyclopentadienyl)zirconium dichloride.

11. A polypropylene composition according to claim 1, which has been obtained by polymerization of the polypropylene [I] followed by copolymerization of the propylene-α-olefin [II].

* * * * *